A. J. GOLATA AND L. L. ROBERTS.
PISTON.
APPLICATION FILED NOV. 9, 1917.

1,329,238.

Patented Jan. 27, 1920.
2 SHEETS—SHEET 1.

UNITED STATES PATENT OFFICE.

ANDREW J. GOLATA AND LOUIS L. ROBERTS, OF DETROIT, MICHIGAN, ASSIGNORS OF ONE-TENTH TO WILLIAM W. CARSWELL AND ONE-TENTH TO ARTHUR L. ELLIS, BOTH OF DETROIT, MICHIGAN.

PISTON.

1,329,238.        Specification of Letters Patent.      Patented Jan. 27, 1920.

Application filed November 9, 1917. Serial No. 201,047.

*To all whom it may concern:*

Be it known that we, ANDREW J. GOLATA and LOUIS L. ROBERTS, citizens of the United States of America, residing at Detroit, in the county of Wayne and State of Michigan, have invented certain new and useful Improvements in Pistons, of which the following is a specification, reference being had therein to the accompanying drawings.

This invention relates to pistons, and has special reference to a piston or reciprocable inner cylinders or sleeves that may be advantageously used in connection with that type of engine disclosed in our application filed Feb. 10, 1917, Serial No. 147,792 and allowed Aug. 3, 1917. In this allowed application, we disclose a piston arrangement which tends to properly balance the crank shaft of an engine, eliminate vibration, insure smooth running and a highly efficient combustion engine. There are reciprocable inner and outer pistons operatable in opposed relation with the outer pistons serving functionally as cylinder valves controlling the ignition, inlet and exhaust of gases to and from the combustion chambers between the heads of the inner and outer pistons.

The present application has special reference to the outer reciprocable pistons of the engine, and our present invention aims to provide a piston with a multiplicity of exterior pockets or compartments, which form a honeycombed or cellular structure, the formation of which is such as to reduce friction to a minimum between the piston and the wall of a cylinder, and at the same time cause a lubricant within the pockets to establish a sliding connection between the piston and the cylinder wall.

Our invention will be hereinafter specifically described and then claimed, and reference will now be had to the drawings wherein—

Figure 1:
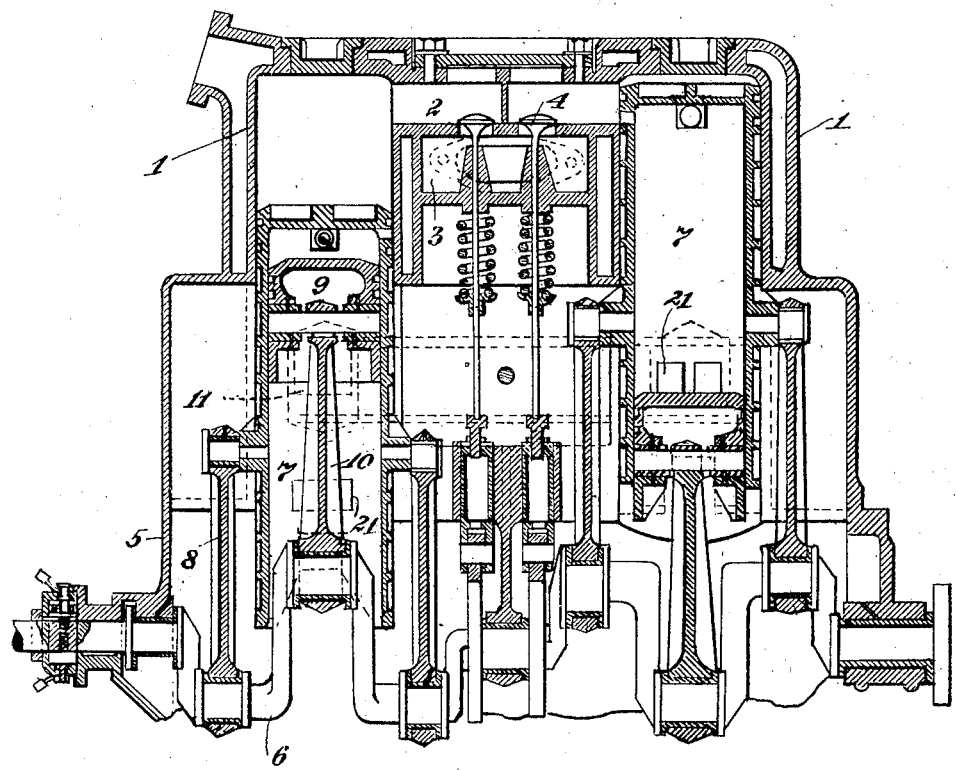
Figure 1 is a longitudinal sectional view of an engine, provided with outer pistons in accordance with our invention.
Figure 3:
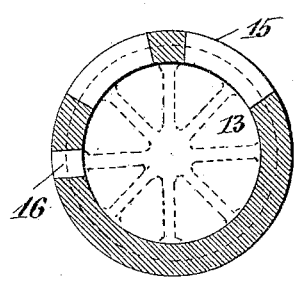
Fig. 3 is a horizontal sectional view on the line III—III of Fig. 2.
Figure 4:
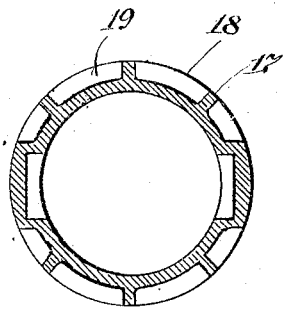
Fig. 4 is a similar view taken on the line IV—IV of Fig. 2.
Figure 2:
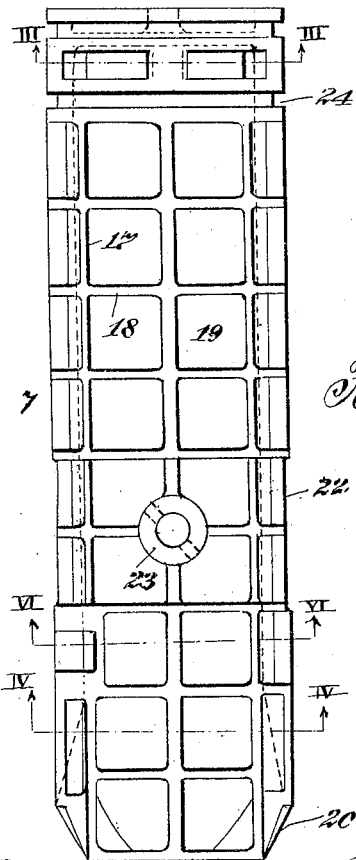
Fig. 2 is an enlarged side elevation of an outer piston.

As illustrating our piston in an engine, there is shown in Fig. 1 a set of cylinders 1 having fuel intake ports 2 adapted to receive fuel from a chamber 3 with the admission of fuel to said ports controlled by puppet valves 4.

The cylinders 1 are above the crank case 5 and extending through the crank case is a crank shaft 6.

Slidable in the cylinders 1 are outer pistons 7, each being connected by rods 8 to crank portions of the shaft 6.

Slidable within the outer pistons 7 are inner pistons 9 connected by rods 10 to other crank portions of the shaft 6, and this same shaft is adapted for actuating the puppet valves 4 in timed relation to the firing order of the cylinders of the engine. Adjacent the lower ends of the cylinders are exhaust ports 11.

Considering the outer pistons, generally denoted 7, reference will be had to Figs. 2 to 6 inclusive, where it will be observed that each piston comprises a cylindrical shell 12 having the lower end thereof open and the upper end provided with a closed top wall 13. Adjacent the top wall 13, the shell 12 is provided with fuel intake openings 15 adapted to register with one of the cylinder ports 2 and besides the intake openings 15 there is an opening 16 for firing purposes, said opening being adapted to register with a spark plug carried by each cylinder.

The shell 12 has the outer walls thereof provided with longitudinal spaced ribs 17 and connecting these longitudinal ribs are circumferentially disposed spaced ribs 18, said ribs coöperating in providing substantially rectangular pockets 19 on the outer wall of the shell 12. These pockets are adapted to receive a lubricant between the outer piston and the cylinder wall, and since the ribs 17 and 18 are the only parts of the piston that contact with the cylinder walls there is a minimum degree of friction between the piston and the cylinder during the reciprocation of said piston.

The lower open end of the piston has inset portions 20 that will provide clearance for crank portions of the shaft 6, and contiguous to the lower end of the piston are exhaust ports 21 adapted to register with exhaust ports in the cylinders.

Intermediate the ends of the piston shell is an annular inset portion 22 provided with diametrically opposed bosses 23 so that the connecting rods 8 may be attached to said piston in the usual manner.

Figure 5:
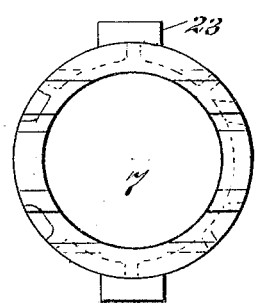
Fig. 5 is a bottom plan of the piston.
Figure 6:
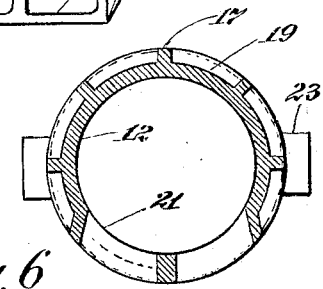
Fig. 6 is a cross sectional view taken on the line VI—VI of Fig. 2.

In the upper end of the piston shell 12 there are annular grooves 24 for suitable piston or packing rings, and by reference to Figs. 1 and 5, it will be noted that the lower end of the piston shell will provide clearance for crank portions of the shaft 6 when the pistons are in their lowermost position.

What we claim is:—

A piston for a two cycle engine comprising a cylindrical shell having the lower end thereof open and the upper end thereof closed and provided with piston ring grooves, that portion of said piston between said grooves provided with lateral openings in proximity to each other and lubricant holding chambers in the remaining portion between said grooves, said piston having exhaust openings intermediate the ends thereof, longitudinal and circumferentially disposed ribs on the outer wall of said shell providing lubricant holding pockets, with some of the pockets between the exhaust openings, and the entire outer surface of the piston forming a honeycomb or cellular wall, and diametrically opposed exterior bosses on said shell at the junction of some of said ribs affording connection for a pair of connecting rods.

In testimony whereof we affix our signatures in presence of two witnesses.

ANDREW J. GOLATA.
LOUIS L. ROBERTS.

Witnesses:
 KARL H. BUTLER,
 ANNA M. DORR.